June 24, 1958  S. G. DANIAS  2,840,034
WATER LEVEL INDICATOR FOR AUTOMOBILE RADIATORS
Filed Dec. 8, 1955  2 Sheets-Sheet 1

INVENTOR.
SPIRO G. DANIAS
BY
ATTORNEY

June 24, 1958  S. G. DANIAS  2,840,034
WATER LEVEL INDICATOR FOR AUTOMOBILE RADIATORS
Filed Dec. 8, 1955  2 Sheets-Sheet 2
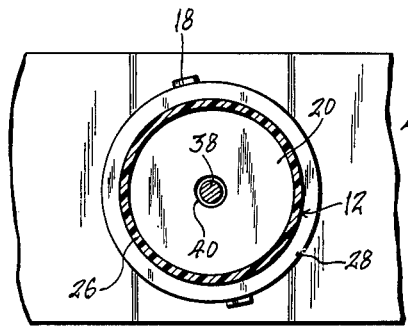
Fig. 3.
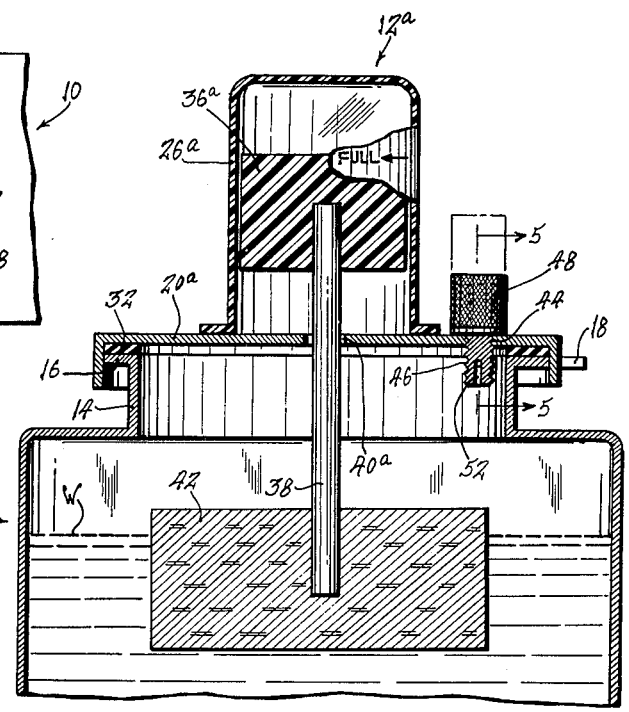
Fig. 4.
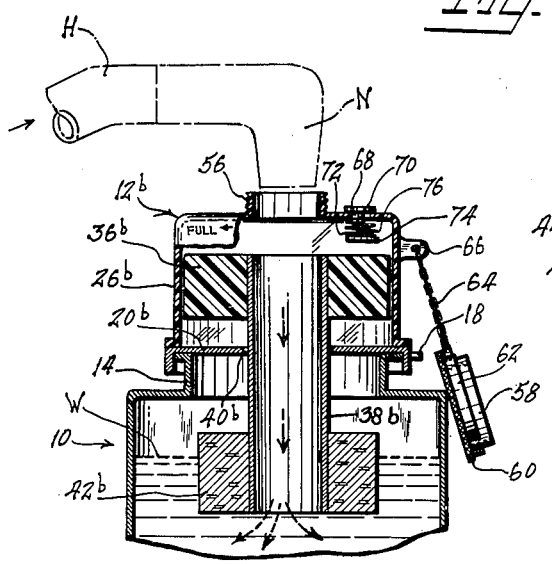
Fig. 6.
Fig. 5.
INVENTOR.
SPIRO G. DANIAS
BY
ATTORNEY

United States Patent Office 2,840,034
Patented June 24, 1958

2,840,034

WATER LEVEL INDICATOR FOR AUTOMOBILE RADIATORS

Spiro G. Danias, Forest Hills, N. Y.

Application December 8, 1955, Serial No. 551,812

3 Claims. (Cl. 116—118)

This invention relates to a water level indicating device, adapted to be incorporated in the cap of an automobile radiator.

Ordinarily, to check the water level within a vehicle radiator, it is necessary that the radiator cap be removed, after which the service station attendant looks into the radiator for the purpose of observing the water level. Often it is difficult to ascertain the water level in this manner, and as a result, the checking operation is not carried out efficiently. In some instances, the water level is permitted to drop to a dangerously low extent, while in other instances, believing that the radiator needs filling when in actuality the level is sufficiently high, the service station attendant may pour water into the radiator, with the result that the water almost immediately overflows.

In view of the above, the main object of the present invention is to provide a water level indicator for a radiator, which can be substituted for the cap presently employed on a vehicle radiator. Said indicator, when attached, permits one to observe immediately, without the necessity of removing the cap, whether the water level has dropped below the so-called "full" mark. In carrying out the invention, there is provided a cap plate attachable to the conventional filler neck of a radiator, and a transparent, upwardly projecting dome in which is disposed a head of a stem, with the stem being axially shiftable within the cap plate and having at its lower end a float buoyantly supported in the water. The head, when moved upwardly within the dome, is adapted to register with a marking provided upon the dome, and when in registration with said marking provides an indication that the water level is at a proper height. Whenever the head of the stem drops below said marking, indication is provided that the radiator needs additional water, and further, the extent to which the head moves downwardly from said marking permits one to determine in advance how much water, approximately, is needed, so that care can be taken to prevent overflowing when the water is being added.

An object of importance is to provide a device of the type referred to which can be substituted for a conventional radiator cap of automobiles of modern design, without requiring modification or redesign of the usual filler neck provided upon the radiator.

Another object of importance is to provide a device of the nature referred to which can be manufactured at a very low cost, considering the benefits to be obtained from the use thereof, and which further is so designed as to operate efficiently over a long period of time, with the possibility of faulty operation being reduced to a minimum due to the simplicity of design.

Another object of importance is to so form the device as to permit a valve to be incorporated therein, which valve can be turned for the purpose of permitting the escape of steam accumulating within the radiator cap, whenever the cooling system is functioning improperly, due, for example, to freezing of the water.

The desirability of a valve of the type referred to can be readily appreciated, in view of the fact that when the conventional radiator cap is grasped, under conditions in which the water is boiling within the radiator, the cap is so hot to the touch as to often burn the hand of the person attempting to remove the cap. As a result, it is difficult in these circumstances to take off the cap to permit the full release of the steam.

In view of the above, there is provided in accordance with the present invention, in at least one form of the device, a manually operable valve adapted to be formed of a material having a relatively low rate of thermal conductivity, said valve being normally closed, but being adapted to be unseated for the purpose of permitting the escape of steam from the radiator. This is achieved without removal of the cap itself and without any contact with the metal material of the cap.

A further object of importance, in another form of the invention, is to provide a cap for an automobile radiator, which will be particularly designed to permit filling of the radiator with water flowing from small bore nozzles such as those in widespread use in present day service stations, the device in this form being so designed as to include a small auxiliary cap element that can be removed for insertion of the nozzle, with the cap proper being left upon the filler neck of the automobile radiator. In this arrangement, not only is visual sighting of the head of the device through a transparent dome possible, but further, when the radiator is being filled, the rising of the water level will elevate the head, and said head ultimately will impinge against an upwardly movable, normally closed valve, to unseat the valve and permit the unseated condition of the valve to be immediately apparent to the service station attendant, so that the flow of water can be immediately cut off. Further, in this form of the invention, the valve is adapted to serve a function other than signalling the filling of the tank, and is adapted to be automatically unseated whenever steam pressure within the radiator rises to an excessive extent, for relieving said pressure.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a plan sectional view on line 3—3 of Fig. 1.

Fig. 4 is a vertical sectional view through a modified construction.

Fig. 5 is an enlarged, detail sectional view on line 5—5 of Fig. 4.

Fig. 6 is a vertical sectional view showing a second modification, a nozzle used for filling the automobile radiator being shown in dotted outline.

Figure 1:
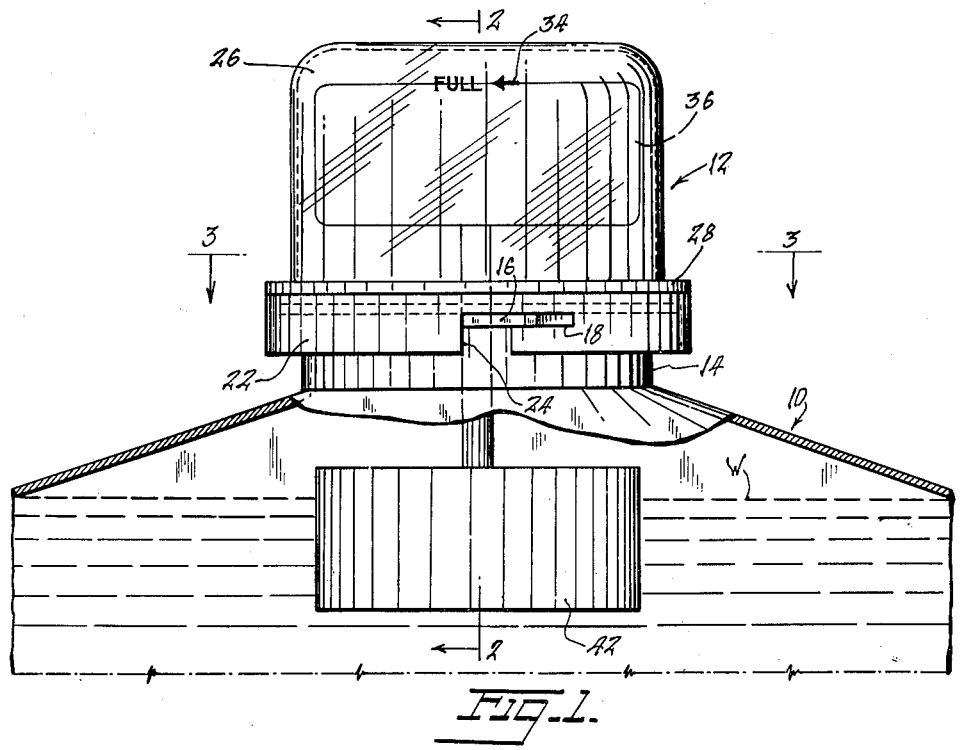
Fig. 1 is a view of an automobile radiator cap formed in accordance with the present invention, in side elevation, as it appears when mounted upon an automobile radiator, said radiator being shown partially in section.

Designated generally at 10 is a conventional automobile radiator, while at 12 there has been designated the radiator cap constituting the present invention. The radiator, as usual, has an upstanding, cylindrical filler neck 14 formed at its upper end with an outwardly directed peripheral flange 16 having diametrically opposed, radially extending lugs 18.

The radiator cap 12 includes a flat, circular cap plate 20 formed at its periphery with a depending flange 22 having at diametrically opposed locations bayonet slots 24 in which the lugs 18 are engageable responsive to positioning of the cap plate upon the filler neck and partial rotation of the cap plate in one direction.

A cylindrical dome 26 of transparent plastic is supported upon the cap plate 20, and has an outwardly directed circumferential flange 28 cemented at 30 to the marginal part of cap plate 20. If desired, an annular rubber gasket 32 can be cemented to the underside of the cap plate 20, at the periphery thereof, with said gasket bearing against the flange 16 to prevent leakage between the cap plate and the filler neck.

A circular cylindrical head 36 formed of plastic or similar material, has a flat top surface, and said head is so proportioned as to outer diameter as to be freely movable in a vertical direction within the dome. The dome includes on its outer cylindrical surface (see Fig. 1) an index marking 34 besides which may be disposed the word "full." When head 36 is elevated to the position shown in Figs. 1 and 2, the top surface of the head registers with the index marking, and this provides an indicaiton that the level of the water W within the radiator is sufficiently high as not to require additional water within the radiator.

Figure 2:
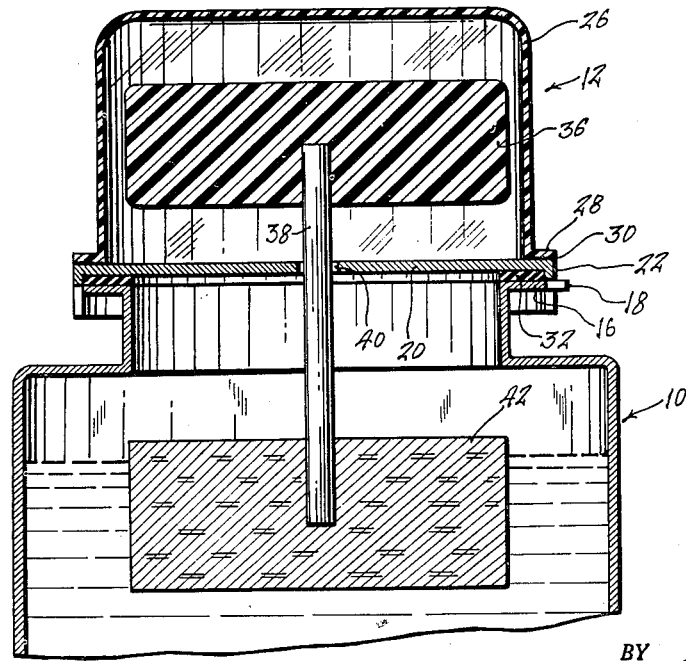
Fig. 2 is a vertical sectional view on line 2—2 of Fig. 1.

Fixedly secured to and depending axially from the head 36 is a stem 38 loosely slidable within a center opening 40 of the cap plate. At its lower end, the stem is embedded axially in the center portion of a circular cylindrical float, 42 formed of cork or other buoyant material, said float being buoyantly supported in the water W as shown in Fig. 2. The diameter of the float is substantially equal to the internal diameter of neck 14 and to the diameter of head 36.

By reason of the construction illustrated and described, when the water level rises the stem 38 will be axially shifted upwardly within the dome, and will elevate the head 36, until ultimately the head will register at its upper surface with the "full" marking 34. Thus, one can immediately perceive, without removal of the cap, whether additional water is needed within the radiator 10. Whenever the head drops below the "full" marking 34, water should be added, and the cap plate is removed in the regular manner to permit the flow of water into the tank.

In Figs. 4 and 5 there is shown a modified construction, wherein the cap plate $20^a$ is formed similarly to the cap plate 20, except for having a threaded opening 44 adjacent its margin, said opening communicating with the interior of the radiator 10. Cap plate $20^a$ has a center opening $40^a$ receiving the stem 38, the stem 38 being secured at its lower end to the float 42, exactly as in the first form of the invention.

However, in this form of the invention the stem at its upper end is axially secured to a head $36^a$ which, though of circular cylindrical outer configuration, is smaller in diameter than the head 36. Head $36^a$ is freely movable in a vertical direction within a dome $26^a$ of transparent plastic, having an outwardly directed flange at its lower end cemented to the upper surface of the cap plate $20^a$. The dome has its "full" marking, as in the first form of the invention, and when the upper surface of the head $36^a$ is in registration with the full marking of dome $26^a$ it will be apparent that additional water is not needed in the radiator. Since the diameter of float 42 is greater than head $36^a$ and is substantially equal to the internal diameter of neck 14, neither stem 38 nor head $36^a$ can bind on the sides of opening $40^a$ and the cylindrical wall of dome $26^a$ respectively as the float is buoyed up by the water in the radiator.

The modified device $12^a$ in Fig. 4 has a small diameter dome, for the purpose of exposing a substantial part of the cap plate $20^a$ at its margin. The opening 44 opens upon said part of the cap plate, and threadedly engaged in said opening is a threaded shank 46 of a manually operated valve, said valve having a cylindrical, knurled head 48. The valve is formed wholly of material having a low rate of thermal conductivity, and cemented to the underside of the head of the valve is an annular gasket 50 preventing leakage through the opening 44 when the head of the valve is turned home against the surface of the cap plate $20^a$.

Formed in the shank is an axial bore 52, said bore opening at one end upon the free, lower end of the shank, and communicating at its upper end with a radially extending passage 54 opening upon the threaded surface of the shank.

By reason of this construction, it will be apparent that when the valve is seated as shown in full lines in Fig. 4, the passage 52, 54 will be disposed wholly within the filler neck 14. When, however, the valve is shifted to the dotted line position of Fig. 4 by manual backing of the shank out of the threaded opening 44, the radial opening 54 will now be disposed above the level of the cap plate $20^a$, and as a result, any steam accumulating within the radiator will be free to escape through the passages 52, 54 to atmosphere. In this regard, it will be understood that the passage can be of any diameter, the valve construction of Figs. 4 and 5 being merely illustrative. In a commercial embodiment, to permit the escape of steam within a minimum period of time, the valve passage, and the shank of the valve, can be substantially greater in diameter, and the transverse area of said passage will be selected according to the rate at which it is desired to permit steam to escape from the radiator.

In Fig. 6 there is shown another modified construction. In this construction, the device $12^b$ includes a cap $20^b$ which is formed similarly to the cap plate 20 of the first form of the invention, except for having a center opening $40^b$ substantially greater in diameter than the opening $40^a$. Loosely slidable within the opening $40^b$ is a tubular stem $38^b$ of substantial diameter, fixedly secured at its upper end to a head $36^b$ vertically shiftable within a transparent dome $26^b$ having a "full" marking similar to that provided in the first form of the invention. At its lower end, the stem is secured to a float $42^b$, and as shown, the stem opens at its upper end above the upper surface of the head $36^b$, and at its lower end opens through the lower surface of the float $42^b$.

The dome $26^b$ is integrally provided, at its upper end, with an upwardly projecting, cylindrical, externally threaded filler neck 56, and normally capping the dome is a removable cap element 58 internally threaded for engagement with the neck 56. The cap 58 is provided with a knurled flange 60 to facilitate manual rotation of the cap, and rotatable upon the cap is a ring 62 having an apertured lug to which is connected one end of a chain 64 the other end of which is connected to an apertured lug 66 integrally formed upon and projecting radially outwardly from the dome $26^b$. This is to prevent loss of the cap element 58 when said cap element is removed to permit insertion of a nozzle N carried by a hose H through which water is directed under pressure into the automobile radiator.

The nozzle is of conventional construction, and is a type of nozzle in widespread use in modern service stations. Ordonarily, the nozzle is inserted directly through the filler neck 14 of Fig. 1, but in accordance with the Fig. 6 construction, the cap plate $20^b$ need not be removed when a nozzle of the type shown is being used. Instead, the cap element is removed, and the nozzle is inserted directly into the upper end of the tubular stem, the water flowing downwardly through the stem into the automobile radiator.

Means is provided in the dome to signal to the service station attendant the fact that the water has reached a proper level. This eliminates the necessity of the attendant viewing the head $36^b$ through the transparent material of the dome $26^b$.

The means referred to includes a spring loaded valve, mounted in position to normally close an opening 68 formed in the dome 26b, in the top wall of the dome. The valve includes a disc 70 greater in diameter than opening 68 and normally overlying the opening as shown in Fig. 6. Secured to the disc 70 is a stem 72 extending through the opening 68 and formed to a diameter substantially less than that of the opening. To the lower end of the stem there is connected a collar 74, and interposed between the collar and the top wall of the dome is a light compression spring 76 circumposed about the stem 72.

When the head 36b rises during filling of the tank, it will ultimately engage the collar 74, and will exert upward pressure thereagainst. This causes spring 76 to compress, permitting elevation of the valve disc 70. As soon as the attendant sees the valve disc rising, he is made aware that the radiator has filled to a proper level. The collar 74, as will be noted, is normally disposed slightly below the level of the "full" marking of the dome, so that the upper surface of head 36b will be at said marking when the disc 70 is first shifted upwardly.

The valve serves a dual function, in that it is not only a signal means to be used when the radiator is being filled, but also constitutes a pressure relief valve should steam pressure within the radiator accumulate to an undesirably high degree. Under these circumstances, said pressure will be asserted against the exposed portion of the underside of the disc 70, through the opening 68, and will unseat the disc against the restraint of the spring 76. The tension of the spring can be selected to cause unseating of the valve only when the pressure rises beyond a predetermined value, and it is believed sufficiently obvious as not to require special illustration that means can be incorporated in the construction to adjust the tension of the spring, such as, for example, a threaded connection between the stem 72 and the collar 74.

After the tank has been filled, the cap element is replaced, and subsequently, one desiring to ascertain whether additional water is needed need only observe the position of the head 36b relative to the "full" marking.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A cap for a liquid-containing automobile radiator having a cylindrical filler neck with a peripheral flange directed outwardly therefrom, comprising a flat, circular cap plate formed at its periphery with a depending flange adapted to engage said peripheral flange, a hollow dome of transparent material having a cylindrical wall and flat top supported concentrically on said cap plate and secured thereto, a cylindrical head disposed in said dome and movable axially therein, said head having a diameter substantially equal to the internal diameter of the dome and being guided and limited in movement by the cylindrical wall of the dome, said wall carrying indicia thereon indicative of the level of liquid in said radiator, said plate having a central opening therein, an elongated stem secured to said head and extending axially therefrom through said opening, and a cylindrical float, said stem being embedded axially in said float, said float having flat ends and a diameter substantially greater than the diameter of said head, so that the stem moves freely in said opening and said head moves freely in said dome without binding on the sides of the opening and dome respectively while said float is buoyed up by said liquid.

2. In a liquid-containing automobile radiator, the combination comprising a cylindrical filler neck with a peripheral flange directed outwardly therefrom, a flat circular cap plate formed at its periphery with a depending flange removably engaged with said peripheral flange, a hollow dome of transparent material having a cylindrical wall and flat top supported concentrically on said cap plate and secured thereto, a cylindrical head disposed in said dome and movable axially therein, said head having a diameter substantially equal to the internal diameter of the dome and being guided and limited in movement by the cylindrical wall of the dome, said wall carrying indicia thereon indicative of the level of said liquid in the radiator, said plate having a central opening therein, an elongated stem secured to said head and extending axially therefrom through said opening, and a cylindrical float, said stem being embedded axially in said float, said float having flat ends and a diameter substantially equal to the internal diameter of said neck, so that the stem moves freely in the opening and the head moves freely in the dome without binding on the sides of the opening and dome respectively while the float is buoyed up by said liquid.

3. The combination according to claim 2, wherein said stem is a hollow tube extending completely through said head and float, said flat top having a central aperture therein in alignment with the hollow tube for filling the radiator with liquid therethrough.

References Cited in the file of this patent

UNITED STATES PATENTS

| | | |
|---|---|---|
| 1,432,385 | Connors | Oct. 17, 1922 |
| 1,493,570 | Slate | May 13, 1924 |
| 1,794,815 | Wilt | Mar. 3, 1931 |
| 2,240,669 | Russo | May 6, 1941 |
| 2,510,663 | Schuessler | June 6, 1950 |
| 2,732,820 | Hoyt | Jan. 31, 1956 |